May 21, 1968 E. P. CHABICA ET AL 3,384,025
PUMP CONSTRUCTION
Filed Aug. 11, 1966
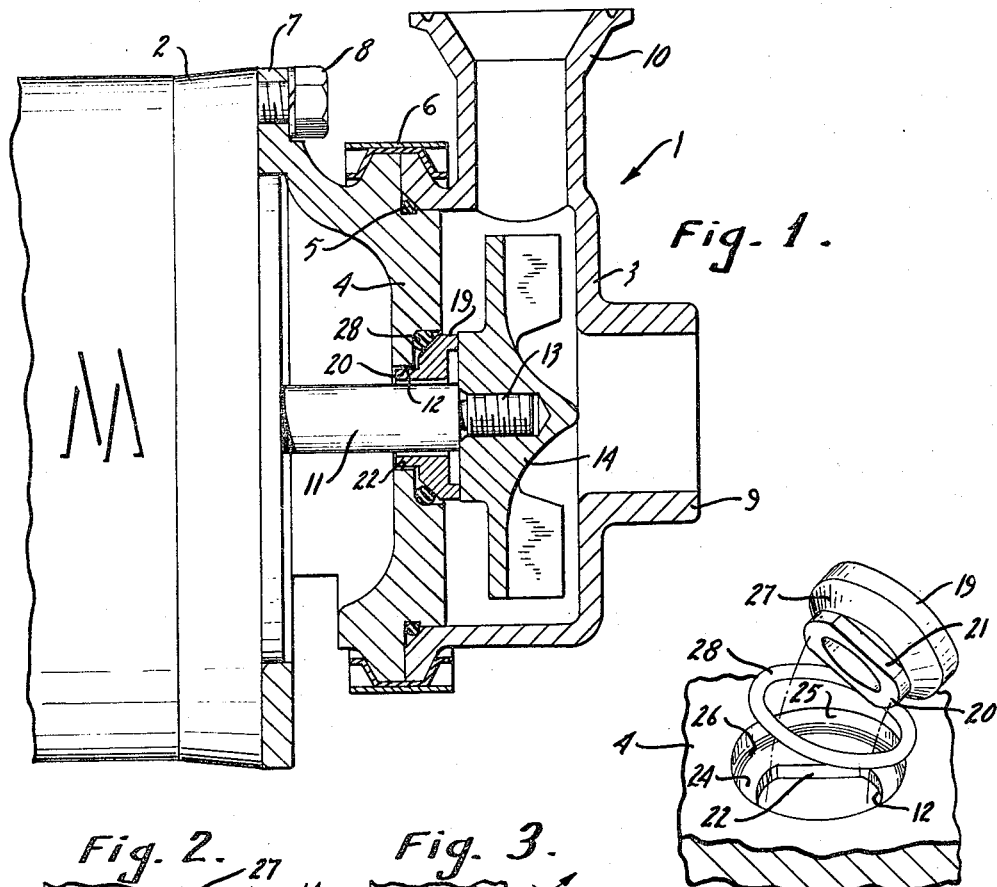
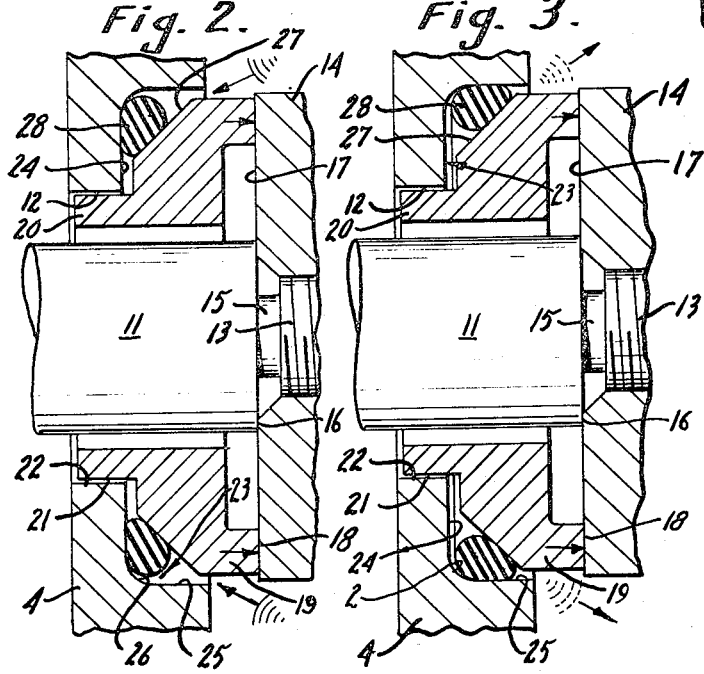
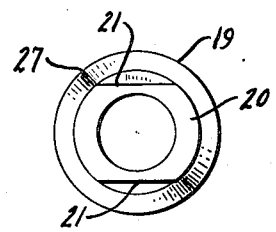
INVENTORS.
EDWARD P. CHABICA
JOHN N. HINCKLEY
BY
Andrus & Starke
ATTORNEYS United States Patent Office 3,384,025
Patented May 21, 1968

3,384,025
PUMP CONSTRUCTION
Edward P. Chabica and John N. Hinckley, Delavan, Wis., assignors to Sta-Rite Industries, Inc., Delavan, Wis., a corporation of Wisconsin
Filed Aug. 11, 1966, Ser. No. 571,882
9 Claims. (Cl. 103—103)

ABSTRACT OF THE DISCLOSURE

The invention relates to a mechanical shaft seal for a pump, which includes a seal ring axially movable on the motor shaft and having a sealing surface adapted to engage a sealing surface on the back side of the impeller. The seal ring is provided with an inclined surface and a resilient annular member is located between the inclined surface and a recess formed in a pump housing.

---

If a positive pressure differential exists between the interior of the pump casing and the exterior, the pressure will force the resilient member radially inward against the inclined surface of the seal ring to move the seal ring axially outward and urge the sealing surface of the ring against the mating sealing surface on the impeller. If a vacuum exists in the pump casing, the negative pressure differential will urge the resilient member axially against the inclined surface to move the sealing surface of the ring against the sealing surface on the impeller.

This invention relates to a pump construction and more particularly to an automatic shaft seal for an impeller shaft in a pump.

To prevent leakage of the pumpage outwardly from the pump casing along the impeller shaft a mechanical shaft seal is normally employed. In a common type of shaft seal, a static sealing element is spring loaded against a rotating surface on the impeller shaft or on the impeller itself to provide a dynamic seal. The conventional mechanical shaft seal normally includes at least five elements, and this large number of parts not only adds to the overall cost of the pump but increases the labor of assembly and also increases the likelihood of improper assembly during production and maintenance. As a further problem, the conventional mechanical seal employs a number of metallic parts which are subjected to galvanic action and corrosion.

In the conventional shaft seal, the resilient element, such as a coil spring, which urges the static sealing element against the rotating surface provides a sealing force of constant magnitude which does not vary with variations in the pressure differential between the inside of the pump casing and the exterior and thus causes rapid seal surface wear.

The present invention is directed to an improved mechanical shaft seal for a pump which includes a minimum number of parts and automatically varies the sealing pressure in proportion to the pressure differential between the inside of the pump casing and the exterior. More specifically, the pump includes a casing having an open end enclosed by an adapter plate. An impeller located within the casing is secured directly to the motor shaft, and the rear surface or face of the impeller acts as a mating seal surface which is engaged with a sealing surface of a seal ring located around the drive shaft. The seal ring is mounted on the adapter plate in a manner so that it is fixed with respect to rotation and yet can move axially with relation to the drive shaft. The seal ring is provided with an inclined surface and a resilient O-ring is located between the inclined surface and a recess formed in the adapter plate.

The recess in the adapter plate includes a bottom wall extending normal to the axis of the drive shaft, and an annular side wall which is connected to the bottom wall by a curved corner. Under static conditions the O-ring seal is located in the corner of the recess and is slightly compressed to provide a static seal. If, during the pumping operation, a positive pressure differential exists between the interior of the pump casing and exterior, the pressure will force the O-ring against the bottom wall of the recess, and the O-ring acting against the inclined surface of the seal ring will move the sealing ring axially outwardly to urge the sealing surface of the ring against the mating sealing surface on the rear face of the impeller. Conversely, if a vacuum exists in the pump casing, the negative pressure differential will urge the O-ring toward the side wall of the recess and again the O-ring will act against the wedge or inclined surface to move the sealing ring axially outwardly toward the impeller to increase the magnitude of the sealing force.

With the seal of the invention the magnitude of the sealing force is proportional to the pressure differential across the O-ring, or essentially, the difference in the pressure between the pump casing and the exterior. Thus the force applied to the seal ring is automatically adjusted and maintained by the pressure differential. This differs from the conventional mechanical shaft seal construction which utilizes a spring loaded force of constant magnitude. Moreover, as the magnitude of the force is proportional to the pressure differential, there is less starting torque with the construction of the invention over that of a conventional unit which employs a constant spring loaded force on the sealing surfaces.

The shaft seal of the invention requires only two parts, namely, the seal ring and the O-ring and this is a substantial reduction in the number of parts over the conventional mechanical shaft seal which normally utilizes at least five elements. As the number of parts is substantially reduced, the cost of the seal, as well as the cost of labor in assembling the seal is considerably reduced. Furthermore, with a reduction in the number of parts there is less likelihood of the seal being improperly assembled during production or maintenance.

As the seal of the invention is constructed of nonmetallic materials, there is no likelihood of galvanic action or corrosion. This permits the pump to have wider applications of use and enables the pump to be used in pumping corrosive, heated and abrasive materials.

As a further advantage, the automatic shaft seal of the invention requires less space than former mechanical seals and thereby aids in decreasing the overall size of the pump. Moreover, the seal ring is freely floating on the resilient O-ring and this compensates for any shaft misalignment and aids in preventing transmission of shock and vibration to the motor.

The pump construction of the invention is particularly adapted for use in the food, dairy or chemical processing industries where it is necessary to clean the pump after each operation. In this regard the seal assembly is located entirely within the pump housing and the flow of the pumpage outwardly beyond the pump housing is restricted, thereby resulting in a unit which can more readily be cleaned in place. This differs from the conventional pump design in which the shaft seal is normally located outside of the pump housing with the result that the pumpage can flow within numerous crevices or clearances until reaching the shaft seal and the pumpage located within these crevices in the conventional pump cannot generally be completely removed by the customary clean-in-place techniques.

Other objects and advantages will appear in the course of the following description:

The drawings illustrate the best mode presently contemplated of carrying out the invention.

In the drawings:

FIGURE 1 is a longitudinal section of a pump construction employing the shaft seal of the invention;

FIG. 2 is a fragmentary enlarged section showing the shaft seal when a positive pressure differential exists between the interior of the pump casing and the exterior;

FIG. 3 is a view similar to FIG. 2 showing the shaft seal when a negative pressure differential exists between the interior of the pump casing and the exterior;

FIG. 4 is an enlarged exploded view of the seal assembly; and

FIG. 5 is an end view of the seal ring.

The drawings illustrate a pump 1 which can be used for sanitary applications such as in the dairy industry or food processing industries. The pump 1 is driven by a motor 2 and the pump housing includes a body 3 having an open rear end which is enclosed by an adapter plate 4. The joint between the body 3 and the adapter plate 4 is sealed by an O-ring 5 and the two members are secured together by a conventional clamping band 6.

The inner portion of the adapter plate 4 is provided with a flange 7 which is connected by a series of bolts 8 to the housing of motor 2 to thereby support the pump from the motor.

Liquid is supplied to the pump housing through an inlet 9 and the liquid is discharged from the pump housing through an outlet 10.

The motor drive shaft 11 extends through an opening 12 in the adapter plate 4 and the outer threaded end 13 of the drive shaft has a reduced diameter and is threaded directly within an opening in an impeller 14. As best shown in FIG. 1, the drive shaft is provided with a relief or recess 15 to enable the impeller to be threaded down tightly against the shoulder 16 on the drive shaft.

As shown in FIG. 2, the back surface 17 of the impeller is machined and bears against an annular sealing surface 18 of a seal ring 19 formed of a nonmetallic material such as carbon or the like. Seal ring 19 is located around the drive shaft 11 and is mounted for free axial movement with respect to the drive shaft but is prevented from rotating with relation to the drive shaft and the impeller. In this regard the inner end of seal ring 19 is provided with an annular flange 20 having a pair of opposed flat surfaces 21. The flange is located within opening 12 in adapter plate 4, and the opening 12 is bordered by a pair of flat surfaces 22 which complement the flat surfaces 21. The engagement of the flat surfaces 21 of flange 20 with the flat surfaces 22 prevents relative rotation between the seal ring 19 and the adapter plate 4 but permits axial movement of the seal ring.

While the drawings illustrate the seal ring 19 being fixed with respect to rotation by use of flat surfaces 21 and 22, it is contemplated that other constructions can be employed to prevent relative rotation between the elements and yet provide axial movement of the seal ring 19 along the drive shaft. A recess 23 is formed in the adapted plate 4, and as best shown in FIG. 2, the recess 23 includes a bottom wall 24, which is disposed normal to the axis of the drive shaft 11, and an annular side wall 25 which is connected to the bottom wall 24 by a generally rounded corner 26. The bottom wall 24 and the side wall 25 are arranged at an angle of about 80° to 100°, and preferably about 90°, with respect to each other.

Formed on the central portion of the seal ring 19 is an incline surface 27 which extends at an angle of 30° to 60° with respect to the axis of drive shaft 11, and preferably about 45°. Positioned between the incline surface 27 and the recess 23 is a flexible O-ring 28 formed of resilient material such as rubber, plastic or the like. The cross sectional radius of O-ring 28 is substantially equal to the radius of the rounded corner 26, and under static non-operating conditions of the pump, the O-ring 28 is slightly compressed and provides a static seal between the seal ring 19 and the adapter plate 4.

When the pump is operating and a positive pressure differential exists between the interior of the pump casing and the exterior, this pressure differential acting on either side of the O-ring 28 will force the O-ring against the bottom wall 24 of the recess 23, as shown in FIG. 2. As the O-ring 28 is forced inwardly against the bottom wall 24 it moves against the incline surface 27 and by a wedging action, urges the seal ring 19 axially outwardly to increase the sealing pressure between the annular sealing surface 18 and the backside 17 of the impeller. Thus, as the magnitude of the pressure differential increases, the force applied to the sealing surfaces 18 and 17 will be correspondingly increased.

If the pump is operating as a vacuum pump and a subatmospheric pressure exists in the pump casing, as shown in FIG. 3, the pressure differential will force the O-ring 28 against the annular side wall 25 of the recess 23. As the O-ring moves against the incline surface 27, the ring 19 will be moved axially outward to increase the sealing force between the seal surface 18 and the impeller surface 17. Thus the magnitude of the sealing force will be correspondingly increased as the magnitude of the negative pressure differential is increased.

The automatic shaft seal construction of the invention automatically varies the magnitude of the force at the sealing surfaces in proportion to the pressure differential across the O-ring. This differs from the conventional mechanical shaft seal using a spring loaded sealing member in that the spring loaded member provides a constant sealing force which does not vary with changes in the pressure differential. The constant spring load employed in the conventional mechanical shaft seal results in a rapid seal surface wear and also increases the starting torque for the motor. The present construction by varying the sealing force in proportion to the pressure differential reduces the wear on the sealing elements and also reduces the starting torque on the motor.

The seal of the invention requires only two parts, the seal ring 19 and the O-ring 28. This is a substantial reduction in the number of parts over that of the conventional seal which utilizes at least five or more elements. By reducing the number of parts the cost of manufacture and assembly is reduced as well as reducing the likelihood of improper assembly.

The seal of the invention is considerably more durable than conventional types because the elements are all made from nonmetallic materials, thereby eliminating the possibility of galvanic action or corrosion of the seal components.

The shaft seal of the invention, by utilizing a minimum number of parts, reduces the space requirement for the seal assembly and therefore enables the overall size of the pump to be correspondingly reduced.

The pump utilizing the automatic mechanical shaft seal of the invention can be used as a sanitary pump, a nonsanitary pump, a chemical pump, a water pump or the like. The shaft seal has particular application for a pump to be used in the dairy or food processing industry in which the pump is cleaned after each pumping operation. As the seal is located within the pump housing, the flow of pumpage outwardly beyond the pump is restricted and this results in a unit which can be more readily cleaned in place. Moreover, the O-ring seal provides a greater surface area for the washing solution to contact than conventional mechanical seals, thereby providing a more effective in-place cleaning operation of the seal.

As a further advantage the seal of the invention provides a cooler operation because the liquid being pumped is in direct contact with a substantial surface portion of the seal.

Various modes of carrying out the invention are contemplated as being within the scope of the following claims, particularly pointing out and distinctly claiming the subject matter which is regarded as the invention.

We claim:
1. In a pump, a pump housing defining a pumping chamber, rotatable means including a drive shaft extending through an opening in the pump housing and an impeller located within the pumping chamber and attached to the drive shaft, said rotatable means including a first sealing surface, said housing having an internal recess facing the pumping chamber and surrounding the motor drive shaft, a seal ring having a second sealing surface on the outer end thereof disposed in engagement with said first sealing surface, said seal ring being fixed with respect to rotation and being free to move axially with relation to said drive shaft, said seal ring having an inclined surface disposed at an acute angle with respect to the axis of the drive shaft, and an annular deformable resilient member disposed in engagement with the inclined surface and the wall of the housing bordering said recess, the cross-sectional diameter of said resilient member being less than the length of said inclined surface so that said resilient member can move axially on said inclined surface, one side of said resilient member being exposed to the pressure within the pumping chamber and the opposite side of the resilient member being exposed to an external pressure, the differential between the pressure of the pumping chamber and the external pressure acting to move said resilient member against said inclined surface to thereby urge said second sealing surface into engagement with said first sealing surface.

2. The pump of claim 1, in which said first sealing surface is on the back side of the impeller and is disposed generally normal to the axis of the drive shaft.

3. The pump of claim 2, in which said second sealing surface is disposed generally normal to the axis of the drive shaft.

4. The pump of claim 1, in which said incline surface is annular and diverges outwardly in a direction toward the impeller.

5. The pump of claim 4, in which the recess includes a bottom wall disposed generally normal to the axis of the drive shaft and an annular side wall disposed concentrically of said axis.

6. The pump of claim 5, in which the bottom wall and side wall are connected by a generally rounded corner having a radius substantially equal to the cross-sectional radius of said resilient member.

7. The pump of claim 6, in which the cross-sectional diameter of the resilient member is slightly greater than the distance between the inclined surface and the rounded corner so that the annular resilient member is slightly compressed between the incline surface and the rounded corner under static non-operating conditions.

8. In a pump construction, a pump housing defining a pumping chamber, a motor drive shaft extending through an opening in the pump housing, an impeller located within the pumping chamber and attached to the drive shaft, said impeller having a generally flat, sealing surface facing the motor and disposed generally normal to the axis of the drive shaft, said housing having an internal recess communicating with the pumping chamber and surrounding the motor drive shaft, said recess being defined by a bottom wall extending normal to the axis of the drive shaft and an annular side wall connected to the bottom wall by a generally rounded corner, a seal ring having an annular sealing surface on the outer end disposed in engagement with the sealing surface of the impeller, means for preventing rotation of said seal ring, means for mounting said seal ring for movement in an axial direction, said seal ring having an inclined surface disposed at an acute angle with respect to the axis of the drive shaft, said inclined surface facing said recess and diverging outwardly in a direction toward said impeller, and a resilient O-ring disposed within said recess and in engagement with the inclined surface, one side of said O-ring being exposed to the pressure within the pumping chamber and the opposite side of the O-ring being exposed to an external pressure, the differential between the pressure of the pumping chamber and the external pressure serving to move the O-ring against said inclined surface to thereby move said seal ring axially and urge the annular sealing surface of the seal ring into engagement with the sealing surface of the impeller.

9. In a pump, a pump housing defining a pumping chamber, rotatable means including a drive shaft extending through an opening in the pump housing and an impeller located within the pumping chamber and attached to the drive shaft, said rotatable means including a first sealing surface, said housing having an internal recess facing the pumping chamber and surrounding the motor drive shaft, a seal ring having a second surface disposed in engagement with said first sealing surface, said seal ring being fixed with respect to rotation and being free to move axially with relation to said drive shaft, said seal ring having an inclined surface disposed at an acute angle with respect to the axis of the drive shaft, means responsive to a positive pressure differential between the pressure in said pumping chamber and the exterior for exerting a force against said inclined surface in a first direction to move the seal ring axially and urge said second sealing surface into engagement with said first sealing surface, and means responsive to a negative pressure differential between the pressure of the pumping chamber and the exterior for exerting a force against said inclined surface in a second direction normal to said first direction to move the seal ring axially and urge said second sealing surface into engagement with said first sealing surface.

References Cited

UNITED STATES PATENTS

| | | |
|---|---|---|
| 2,214,243 | 9/1940 | Casson. |
| 2,784,673 | 3/1957 | Nomur. |
| 2,898,861 | 8/1959 | Wakeman. |
| 2,963,978 | 12/1960 | Namur. |
| 2,710,206 | 6/1955 | Huber _____ 277—93 |
| 2,027,505 | 1/1936 | Winkler. |

HENRY F. RADUAZO, *Primary Examiner.*